United States Patent
Iu

Patent Number: 5,815,822
Date of Patent: Sep. 29, 1998

[54] APPARATUS FOR REMOTELY CONTROLLING A VEHICLE IN MOTION

[76] Inventor: Howard Iu, 22 Lacewood Crescent, Don MIlls, Ontario, Canada, M3A 2Z4

[21] Appl. No.: 615,394

[22] Filed: Mar. 12, 1996

[51] Int. Cl.⁶ ............................. B60R 25/10; H04Q 9/00
[52] U.S. Cl. ................................ 701/2; 701/36; 307/10.2
[58] Field of Search ................... 364/426.027, 423.099, 364/424.055, 424.045; 340/426; 180/167, 287; 307/10.2; 701/82, 2, 107, 36

[56] References Cited

U.S. PATENT DOCUMENTS

| | | | |
|---|---|---|---|
| 3,112,004 | 11/1963 | Neaville | 180/82 |
| 3,195,671 | 7/1965 | Wolfe, Sr. | 180/82.1 |
| 3,368,639 | 2/1968 | Deane | 180/98 |
| 3,396,811 | 8/1968 | Bowers | 180/98 |
| 3,580,353 | 5/1971 | Thompson | 180/98 |
| 3,587,769 | 6/1971 | Lotter | 180/98 |
| 3,604,005 | 9/1997 | Gilmore | 343/225 |
| 4,619,231 | 10/1986 | Stoler et al. | 123/333 |
| 4,660,528 | 4/1987 | Buck | 123/333 |
| 4,878,050 | 10/1989 | Kelly | 340/825.06 |
| 4,990,890 | 2/1991 | Newby | 340/539 |
| 4,996,515 | 2/1991 | Schaffer et al. | 340/426 |
| 5,132,551 | 7/1992 | Carlo et al. | 307/10.3 |
| 5,191,324 | 3/1993 | Rydel | 340/825.72 |
| 5,193,641 | 3/1993 | Durell | 180/287 |
| 5,224,567 | 7/1993 | Tomlinson | 180/287 |
| 5,229,648 | 7/1993 | Sues et al. | 307/10.2 |
| 5,276,728 | 1/1994 | Pagliaroli et al. | 379/58 |
| 5,280,267 | 1/1994 | Reggiani | 340/426 |
| 5,287,006 | 2/1994 | Carlo et al. | 307/10.3 |
| 5,293,527 | 3/1994 | Sutton et al. | 340/825.57 |
| 5,351,781 | 10/1994 | Pritchard et al. | 180/287 |
| 5,448,218 | 9/1995 | Espinosa | 340/426 |

*Primary Examiner*—Michael Zanelli
*Attorney, Agent, or Firm*—Sawyer & Associates

[57] ABSTRACT

Apparatus for control of a moving vehicle is disclosed. The apparatus comprises an electronically-activated traction control system for control of traction of the wheels of the vehicle, with computer software for control of the system, a receiver for receiving an electronic signal and which is capable of being activated from a remote location and a controller implementing the computer software within the traction control system which is capable of being activated by a signal transmitted to the receiver. On receipt of the electronic signal, a reduction in the speed of the motor vehicle is effected by activation of the traction control system.

12 Claims, 1 Drawing Sheet

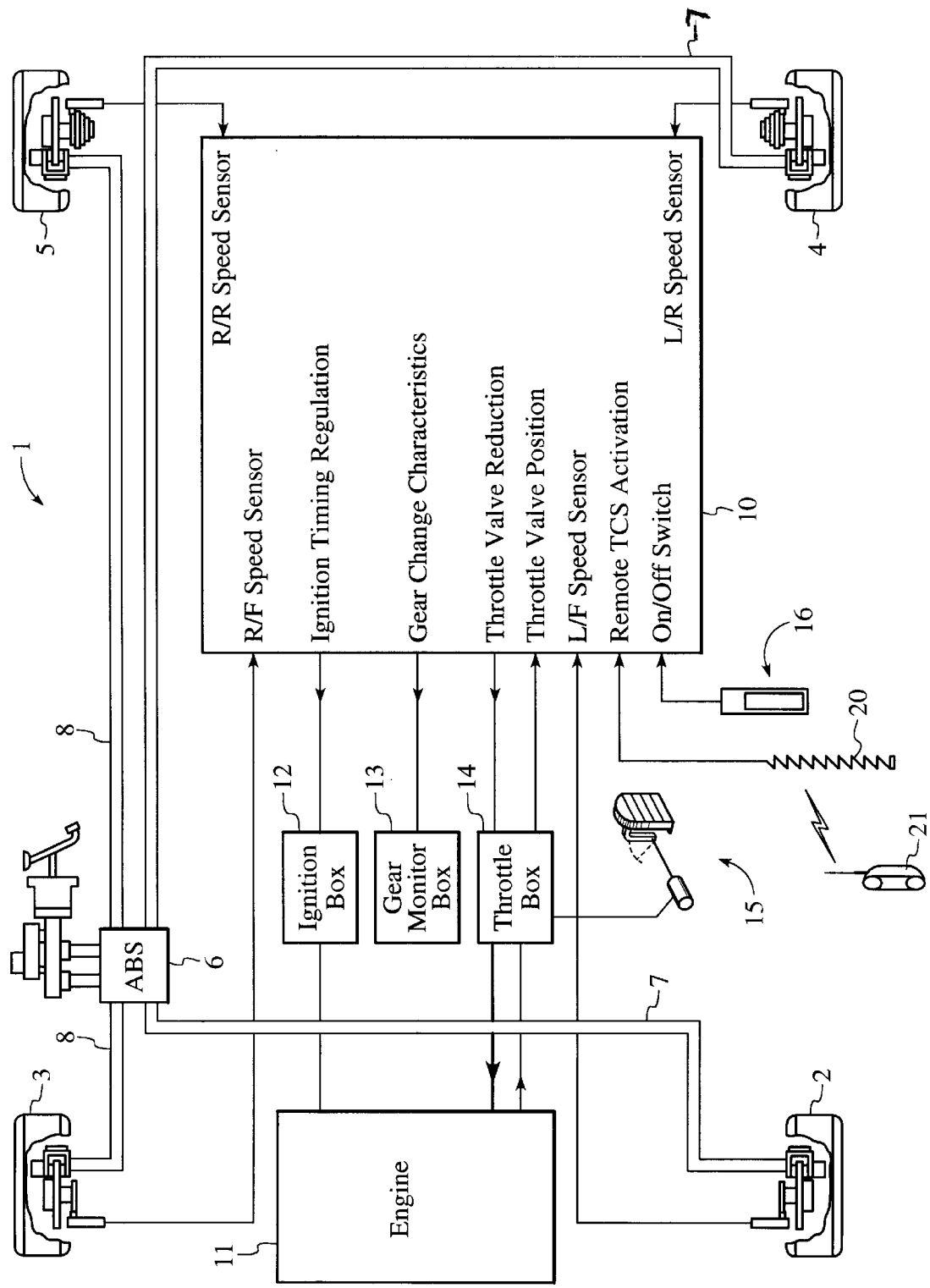

APPARATUS FOR REMOTELY CONTROLLING A VEHICLE IN MOTION

FIELD OF THE INVENTION

The present invention relates to apparatus and a method for remotely controlling, for example slowing, stopping and/or deactivating, an automobile or other vehicle in motion, and in particular relates to apparatus that is activated by a telephone and which utilizes a traction control system of a vehicle to effect a slowing down, stopping or otherwise controlling of the automobile.

BACKGROUND OF THE INVENTION

Automobile theft is a serious problem in society. In some instances, the theft of the automobile results in immediate police activity, including pursuit of the stolen automobile by the police. This may lead to a high speed police chase with a consequent danger to other persons using the roadways, and to the persons in the fleeing vehicle. Considerable property damage, and injury and loss of life to innocent persons or persons in the vehicles may result. In other circumstances, the police may have a need to stop a vehicle to detain persons within the vehicle or for some other reason.

Techniques for stopping a vehicle can involve installation of barriers or other devices on the roadway to require that the automobile stop or to effectively disable the automobile e.g. by puncturing of tires. Such techniques affect all users of the roadway and can cause the traffic pattern to stop, causing traffic jams. Alternatively, the police must pursue the car and issue warnings through sirens or flashing lights to instruct the driver of the automobile to come to a stop. It is when a driver fails to do so that many of the pursuits of automobiles by police occur.

Techniques for the remote control of automobiles are known. For instance in U.S. Pat. No. 3,112,004, A. W. Neaville describes a remote control system where the controlling instructions are transmitted by means of infra red waves, to cut off the fuel supply. U.S. Pat. No. 3,368,639 of S. W. Deane discloses techniques for control of the throttle of the automobile utilizing electrical loops located along roads. U.S. Pat. No. 3,580,353 of K. R. Thompson also utilizes control of the vehicle by cutting off the fuel line supply. U.S. Pat. No. 3,604,005 of R. E. Gilmore relates to a compact relays-and-choke solenoid-operated system for remote control of electrical components of an automobile. U.S. Pat. No. 4,660,528 of G. Buck also disables a vehicle by means of electrical and fuel shut off techniques.

It would be beneficial to be able to control an automobile by remote means without cutting off the fuel supply or otherwise causing the motor of the vehicle to stop running, at least until it is safe to do so. Techniques in which the motor ceases to function can be dangerous in that an automobile in a flowing pattern of traffic would suddenly cease to function, causing disruption and confusion, and quite possibly accidents, amongst the other vehicles on the roadway. In addition, many vehicles have power steering and power brakes and causing the motor to cease to function would mean that the operator would likely lose the ability to control the steering or the braking of the vehicle. This could be very dangerous if the vehicle was operating at high speeds.

SUMMARY OF THE INVENTION

Apparatus and a method have now been found for control of a moving vehicle utilizing electronic means that activate traction control systems installed in such vehicles.

Accordingly the present invention provides apparatus for control of a moving vehicle comprising:

(a) an electronically-activated traction control system for control of traction of the wheels of the vehicle, said system having computer software for control of the system;

(b) a receiver for receiving an electronic signal, especially in the form of a cellular telephone, and capable of being activated from a remote location; and (c) controller within the traction control system capable of being activated by a signal transmitted to the receiver and, on said activation, implement the computer software to effect a reduction in the speed of the motor vehicle by activation of the traction control system.

In a preferred embodiment of the present invention, the vehicle is an automobile.

In a further embodiment, the activation of the traction control system is independent of braking and steering functions of the vehicle.

In another embodiment, the software effects a turning off of the motor of the vehicle on a further signal transmitted to the receiver.

The present invention also provides a method for the control of a moving motor vehicle having an electronically-activated traction control system, comprising activating the traction control system from a remote location, said activation of the traction control system causing a reduction in the speed of the vehicle, said activation of the traffic control system being independent of the steering and braking systems in the vehicle.

BRIEF DESCRIPTION OF THE DRAWINGS

FIG. 1 is a plan view of a vehicle schematically showing an engine, wheels and electronic circuitry.

DESCRIPTION OF THE INVENTION

The present invention will be illustrated with reference to the embodiments shown in the drawing in which:

FIG. 1 is a plan view of a vehicle schematically showing an engine, wheels and electronic circuitry.

Referring to FIG. 1, a vehicle 1 is shown schematically in plan view. Vehicle 1 is shown as having four wheels viz. left front wheel 2, right front wheel 3, left rear wheel 4 and right rear wheel 5. Each of wheels 2–5 is connected to an anti-lock braking system (ABS) controller 6, through ABS fluid pipes 7 and 8 which connect with the left wheels and the right wheels, respectively, of the vehicle.

Controller 10 is shown as being connected to each of wheels 2–5, and obtains speed information from each of the wheels, as indicated by "L/F speed sensor", "R/F speed sensor", "L/R speed sensor" and "R/R speed sensor". Engine 11 is also connected to controller 10. In particular, engine 11 is shown as connected to controller 10 through ignition box 12 so that ignition characteristics of the engine may be monitored and regulated. Gear monitor box 13 provides information on the gearing being used by the vehicle at any particular time, and feeds such information back to controller 10. Throttle box 14 provides information on the throttle valve positions. Accelerator 15 is also connected, electronically, to throttle box 14.

Such use of an anti-lock braking system (ABS) with speed sensors on all wheels, combined with monitoring and control of ignition timing, gear change characteristics and throttle valve positionings is known technology. Such sensors and components are used in traction control in some vehicles offered for sale, in order to improve handling characteristics and control of the vehicle. The traction control system is activated using traction control system switch 16, which is connected to controller 10. The operator of the vehicle can activate or deactivate the traction control system using switch 16. It is to be understood, however, that in some vehicles the traction control system is activated automatically on ignition, and that on such vehicles a switch such as traction control system switch 16 would not exist.

In FIG. 1, receiver 20 is shown as connected to controller 10. In preferred embodiments, receiver 20 is a cellular telephone. Receiver 20 is capable of being activated by remote means, especially by telephone e.g. the cellular telephone network, indicated in FIG. 1 by 21. Such activation is independent of the ON/OFF position of switch 16.

In operation of a vehicle of the type illustrated in FIG. 1, the traction control system may be activated by a user using switch 16. When activated, usually during poor weather conditions or poor driving conditions, controller 10 continuously monitors each of wheels 2–5 as well as engine 11, throttle and/or ignition timing and possibly other characteristics. Controller 10 would then, if necessary, activate controls on one or more of wheels 2–5 in order to improve control of the vehicle.

According to the present invention, it is possible to activate the traction control system by the remote means using a telephone 21 and receiver 20, receiver 20 preferably being a cellular telephone as noted above. When this occurs, receiver 20 communicates with controller 10 which, through appropriate software within controller 10, causes activation of the traction control system, as discussed in more detail below.

If the vehicle was stolen, the traction control system would be activated by means of a telephone 21. An appropriate security plus disabling code would be dialed into receiver 20, which in turn through controller 10 would activate the traction control system. Activation of the traction control system would cause the vehicle to slow down. As an option, when the speed of the vehicle was reduced below some predetermined safe speed for operation of the vehicle, then the fuel and ignition of the vehicle could be shut off, thereby disabling the car. Further, optionally, various other safety features on the vehicle e.g. the four-way flashers, could be activated to signal that the car was disabled. Preferably in order to restart the disabled vehicle, a suitable enabling code would need to be entered into the vehicle, specifically into controller 10, in order to be able to effect re-starting of the vehicle.

The present invention has the ability to bring a vehicle to a stop quickly, especially in vehicles with traction control systems which actively applies braking, thus reducing the risk of the vehicle being or becoming out of control. The steering and braking systems within the vehicle remain operative, again permitting full control of the vehicle. No additional equipment is needed on the part of the manufacturer, provided that traction control is already built into the vehicle. A receiver would be required as well as software modification within controller 10.

The software could be designed such that if the receiver should be removed from the vehicle then the software would automatically be activated, thereby disabling the vehicle before it could be moved. For instance, modern automobiles tend to have electronic engine management systems, which could be turned off automatically on removal of receiver 20 from the vehicle, acting as a further deterrent to theft of the vehicle. The software would be part of the vehicle, within controller 10, and thus very difficult to de-activate.

The invention also permits the flexibility of activation of the traction control system using a cellular telephone, or any other electronic communication means, with appropriate activation and de-activation codes. Activation codes could be made specific to the vehicle. The existing cellular telephone network infrastructure could be used in activation and deactivation of the traction control systems in a vehicle. Thus means to effect the invention may be in place in a vehicle with the only addition required in order to implement the invention being appropriate receiver and software in the vehicle.

The present invention utilizes a signal transmitted via a cellular telephone network to deploy traction control systems to slow a moving car enough before, optionally, turning it off. Present traction control systems from car manufacturers make use of anti-lock brake sensors to detect wheel slippage which initiates a response e.g. a reduction of fuel, a retarding of ignition timing, adjustments to gearing, and in some systems the application of brakes. The present invention adds a signal transmitted by electronic means e.g. a cellular telephone network as an additional trigger of the traction control system. Such a signal could activate traction control on, for instance, both front wheels, both rear wheels or all four wheels of the vehicle.

When it is discovered that a vehicle has been stolen, it would then be possible by use of the cellular telephone network to activate the traction control system on the vehicle. This would be done by dialing in the appropriate security and disabling codes. The traction control system in the vehicle would then be activated, reducing the speed of the vehicle, preferably causing it to come to a halt. Optionally, it would be possible, through the software embodied in the controller, to cause fuel and ignition shut off in the vehicle. If the location of the disabled vehicle was not known to the person activating the traction control system, then the appropriate authorities could be notified to watch for the disabled vehicle. It would be helpful in such circumstances if flashing lights or other means on the vehicle could be activated to signal that the vehicle was disabled. However, as cellular networks and/or satellite navigational infrastructure is improved, it would be feasible to modify receiver 20 to be able to transmit a signal, especially on receipt of a command signal to do so, to enable authorities to locate the vehicle.

There will be a variety of ways in which software could be modified in order to achieve the deactivation of the vehicle as disclosed herein. This will depend, in particular, on the particular type of traction control system employed by the vehicle, including the particular manufacturers of the vehicle. For instance, on activation of the traction control systems according to the present invention, the controller could go through the following sequence:

if (front-left-sensor=on) then
    call traction-control (front-left-sensor)
    if (front-right-sensor=on) then
    call traction-control (front-right-sensor)
    if (rear-left-sensor =on) then
    call traction-control (rear-left-sensor)
    if (rear-right-sensor =on) then
    call traction-control (rear-right-sensor)
    if (activation-receive=on) then
    call traction-control (activation-receive)

where each sensor is a condition indicator which is passed to the traction control program as a parameter. The traction control program of the controller would then deploy traction control according to the condition indicated by the sensors. In addition following activation of the traction control system according to the invention the software could run through a subroutine of measuring the speed of the vehicle, and when the speed was greater than some preset limit, effecting reduction in fuel supplied to the engine and retarding of the ignition, until such time as the speed had been reduced below the predetermined limit, at which time the engine could be turned off.

The present invention provides apparatus and a method for controlling an automobile by remote means, especially when the automobile has been stolen. The apparatus is relatively inexpensive as many car manufacturers and telephone companies already produce components that are required. Traction control and cellular telephones are known and proven technology, and widely offered to the public. Thus, it is believed that existing technology may be adapted to put the present invention into effect.

What is claimed is:

1. Apparatus for control of a moving vehicle comprising:
   (a) an electronically-activated traction control system for control of traction of the wheels of the vehicle, said system having computer software for control of the system;
   (b) a receiver for receiving an electronic signal and which is capable of being activated from a remote location; and
   (c) a controller within the traction control system capable of being activated by a signal transmitted to the receiver and, on said activation, implement the computer software to effect a reduction in the speed of the motor vehicle by activation of the traction control system.

2. The apparatus of claim 1 in which the receiver is a cellular telephone.

3. The apparatus of claim 1 in which activation of the traction control system is independent of braking and steering functions of the vehicle.

4. The apparatus of claim 2 in which activation of the traction control system is independent of braking and steering functions of the vehicle.

5. The apparatus of claim 3 in which the controller effects a turning off of the motor of the vehicle on a further signal transmitted to the receiver.

6. The apparatus of claim 3 in which the controller effects a turning off of the motor of the vehicle when the speed of the vehicle falls below a predetermined speed.

7. The apparatus of claim 3 in which the vehicle is an automobile.

8. A method for the control of a moving motor vehicle having an electronically-activated traction control system, comprising activating the traction control system from a remote location, said activation of the traction control system causing a reduction in the speed of the vehicle, said activation of the traction control system being independent of the steering and braking systems in the vehicle.

9. The method of claim 8 in which a cellular telephone is used in the activation of the traction control system.

10. The method of claim 8 in which the traction control system effects a turning off of the motor of the vehicle on a further signal transmitted thereto from the remote location.

11. The method of claim 8 in which the traction control system effects a turning off of the motor of the vehicle when the speed of the vehicle falls below a predetermined speed.

12. The method of claim 8 in which the vehicle is an automobile.

* * * * *